(12) United States Patent
Lee

(10) Patent No.: US 7,212,596 B2
(45) Date of Patent: May 1, 2007

(54) DATA DETECTION CIRCUIT AND METHOD

(75) Inventor: Dong-gyu Lee, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 745 days.

(21) Appl. No.: 10/448,033

(22) Filed: May 29, 2003

(65) Prior Publication Data

US 2004/0042573 A1    Mar. 4, 2004

(30) Foreign Application Priority Data

Aug. 28, 2002   (KR) .................... 10-2002-0051191

(51) Int. Cl.
*H04L 7/00* (2006.01)

(52) U.S. Cl. .................... 375/354; 375/340; 369/59.17

(58) Field of Classification Search ................ 375/316, 375/340, 354, 362, 363, 365, 368; 327/39, 327/40, 41, 1; 364/715.04; 369/59.1, 59.12, 369/59.17, 59.19, 59.26
See application file for complete search history.

(56) References Cited

U.S. PATENT DOCUMENTS

| | | | | |
|---|---|---|---|---|
| 4,712,217 A | * | 12/1987 | McPherson | ................ 714/809 |
| 4,785,421 A | * | 11/1988 | Takahashi et al. | .......... 708/205 |
| 5,523,991 A | * | 6/1996 | Mizokami et al. | ....... 369/59.19 |
| 5,754,458 A | * | 5/1998 | Beraha et al. | .............. 708/497 |
| 5,905,663 A | * | 5/1999 | Nash | .......................... 708/553 |
| 6,233,213 B1 | * | 5/2001 | Okada et al. | ............ 369/59.12 |
| 2003/0118118 A1 | * | 6/2003 | Yin et al. | .................... 375/242 |

* cited by examiner

*Primary Examiner*—Pankaj Kumar
*Assistant Examiner*—Naheed Ejaz
(74) *Attorney, Agent, or Firm*—Mills & Onello LLP

(57) ABSTRACT

A data detection circuit and method detect a first bit that is the least significant among bits having a value 1 in N-bit input binary data and a second bit that is the second least significant among bits having the value 1 in the N-bit input data. The data detection method includes the steps of receiving N-bit input data, detecting the first bit that is the least significant among bits having the first value in the received N-bit input data, changing only the value of the detected first bit in the N-bit input data into a second value, and outputting thus generated N-bit intermediate data, in response to a clock signal, and then receiving the N-bit intermediate data, detecting a second bit that is the least significant among bits having the first value in the received N-bit intermediate data, and outputting the detection result, in response to an inverted signal of the clock signal.

22 Claims, 4 Drawing Sheets

DATA DETECTION CIRCUIT AND METHOD

BACKGROUND OF THE INVENTION

This application claims the priority of Korean Patent Application No. 2002-51191, filed Aug. 28, 2002, in the Korean Intellectual Property Office, the disclosure of which is incorporated herein in its entirety by reference.

1. Field of the Invention

The present invention relates to a data detection circuit and method that can be used in a microprocessor, and more particularly, to a data detection circuit and method that detect a bit that is the least significant among bits having a first logic value in N-bit input data and a bit that is the second least significant among bits having the first logic value in the N-bit input data.

2. Description of the Related Art

In general, a trailing one or trailing zero circuit is a circuit which detects the location of a value 1 or a value 0 in a data element, by examining input binary data from the least significant bit (LSB) to the most significant bit (MSB) of the input binary data. Meanwhile, a leading one or leading zero circuit is a circuit which detects the location of a value 1 or a value 0 in a data element, by examining input binary data from the MSB to the LSB of the input binary data.

Trailing one circuits and leading one circuits are commonly employed in adders, multiple registers, address detection circuits, and test processors, which, in turn, are common components of microprocessors. Thus, the operation speed of a trailing one circuit or leading one circuit can greatly influence the operation speed of a computer.

There is a demand for contemporary computers to be capable of processing a large amount of data in a very short time. In order to meet the demand for high performance in the computer system, the trailing one or leading one circuits deployed in adders, multiple registers, address detection circuits, and test processors, must also operate at the high performance standard.

SUMMARY OF THE INVENTION

It is an objective of the present invention to provide a data detection circuit which has an improved operation speed and detects a bit that is the least significant among bits having a first value and a bit that is the second least significant among bits having the first value, in an N-bit input binary data element, and a data detection method therefor.

According to an aspect of the present invention, there is provided a data detection method comprising the steps of receiving N-bit input data, detecting a first bit that is the least significant among bits having a first value in the received N-bit input data, changing only the value of the detected first bit in the N-bit input data into a second value, and outputting thus generated N-bit intermediate data, in response to a clock signal, and then receiving the N-bit intermediate data, detecting a second bit that is the least significant among bits having the first value in the received N-bit intermediate data, and outputting the detection result, in response to an inverted signal of the clock signal.

It is preferable that if the first value is 1, the second value is 0, and if the first value is 0, the second value is 1.

According to another aspect of the present invention, there is provided a data detection circuit comprising a first data detection circuit which receives N-bit input data, detects a first bit that is the least significant among bits having a first value in the received N-bit input data, changes only the value of the detected first bit in the N-bit input data into a second value, and outputs thus generated N-bit intermediate data, in response to a clock signal, and a second data detection circuit which receives the N-bit intermediate data, detects a second bit that is the least significant among bits having the first value in the received N-bit intermediate data, and outputs the detection result, in response to an inverted signal of the clock signal.

It is preferable that the first data detection circuit comprises a first encoder which receives the N-bit input data, detects the first bit that is the least significant among bits having the first value in the received N-bit input data, and outputs an encoding value corresponding to the detected first bit, and a first data output circuit which receives the N-bit input data, changes only the value of the detected first bit in the N-bit input data into the second value, and outputs thus generated N-bit intermediate data, in response to the clock signal.

It is preferable that the second data detection circuit comprises a second encoder which receives the N-bit intermediate data, detects the second bit that is the least significant among bits having the first value in the received N-bit intermediate data, and outputs an encoding value corresponding to the detected second bit, and a second data output circuit which receives the N-bit intermediate data, changes only the value of the second bit that is the least significant among bits having the first value in the N-bit intermediate data into the second value, and outputs thus generated N-bit output data, in response to the inverted signal of the clock signal.

It is preferable that the first data detection circuit outputs a first indication signal if the number of bits having the first value in the received N-bit input data is two or more.

It is preferable that the second data detection circuit outputs a second indication signal if the number of bits having the first value in the received N-bit intermediate data is two or more.

It is preferable that if the first value 1, the second value is 0, and if the first value 0, the second value 1.

According to another aspect of the present invention, there is provided a data detection circuit for detecting a first bit that is the least significant among bits having a first value, and a second bit that is the second least significant among bits having the first value, in input data, the data detection circuit comprising a first data detection circuit which receives the input data, detects the first bit that is the least significant among bits having the first value in the input data, and outputs the detected result, and a second data detection circuit which receives data output from the first data detection circuit, detects a second bit that is the least significant among bits having the first value in the output data, and outputs the detection result. Here, the data output from the first data detection circuit are generated by changing only the value of the bit detected as being the least significant among bits having the first value in the input data into a second value.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF PREFERRED EMBODIMENTS

Figure 1:
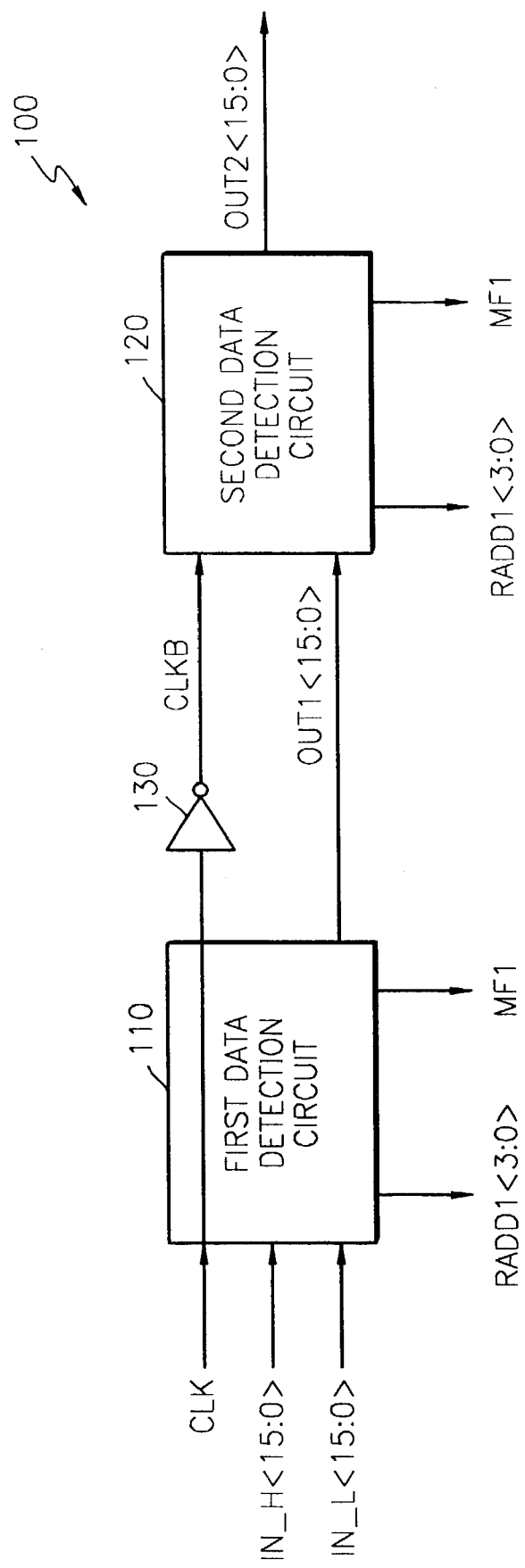
FIG. 1 is a block diagram of a data detection circuit according to a preferred embodiment of the present invention.

FIG. 1 is a block diagram of a data detection circuit according to a preferred embodiment of the present invention, the data detection circuit 100 comprising a first data detection circuit 110, a second detection circuit 120, and an inverter 130.

The data detection circuit 100 according to the present invention is a form of a trailing one circuit, and operates to detect a bit, actually, the location thereof, that is the least significant among bits having a first logic value and a bit that is the second least significant among bits having the first logic value, in an N-bit input binary data element.

For convenience of explanation, an example will now be explained having 16-bit input data. Also, it should be noted that the data detection circuit 100 can readily be modified into the form of a trailing zero circuit, instead of a trailing one circuit.

The first data detection circuit 110, in response to a clock signal (CLK), receives a pair (IN_H<15:0>, IN_L<15:0>) of 16-bit input data elements and detects a bit (or the location of a bit) that is the least significant among bits having a first logic value (for example, 1 or 0) in the received 16-bit input data (IN_H<15:0>). The first data detection circuit 110 changes only the least significant bit having the first logic value in the 16-bit input data (IN_H<15:0>) into a second logic value (for example, 0 if the first logic value 1, and 1 if the first logic value 0) and outputs thus-generated 16-bit intermediate data (OUT1<15:0>) to the second data detection circuit 120. Here, the pair (IN_H<15:0>, IN_L<15:0>) of 16-bit input data elements are complementary to each other.

The second data detection circuit 120, in response to a clock signal (CLKB) as inverted by the inverter 130, receives the 16-bit intermediate data (OUT1<15:0>), detects the location of a bit that is the least significant among bits having the first value in the received 16-bit intermediate data (OUT1<15:0>), and outputs the detected result.

The inverter 130 prevents the first data detection circuit 110 and the second data detection circuit 120 from being activated at the same time. That is, after the operation of the first data detection circuit 110 is complete, the second data detection circuit 120 commences operation.

Figure 2:
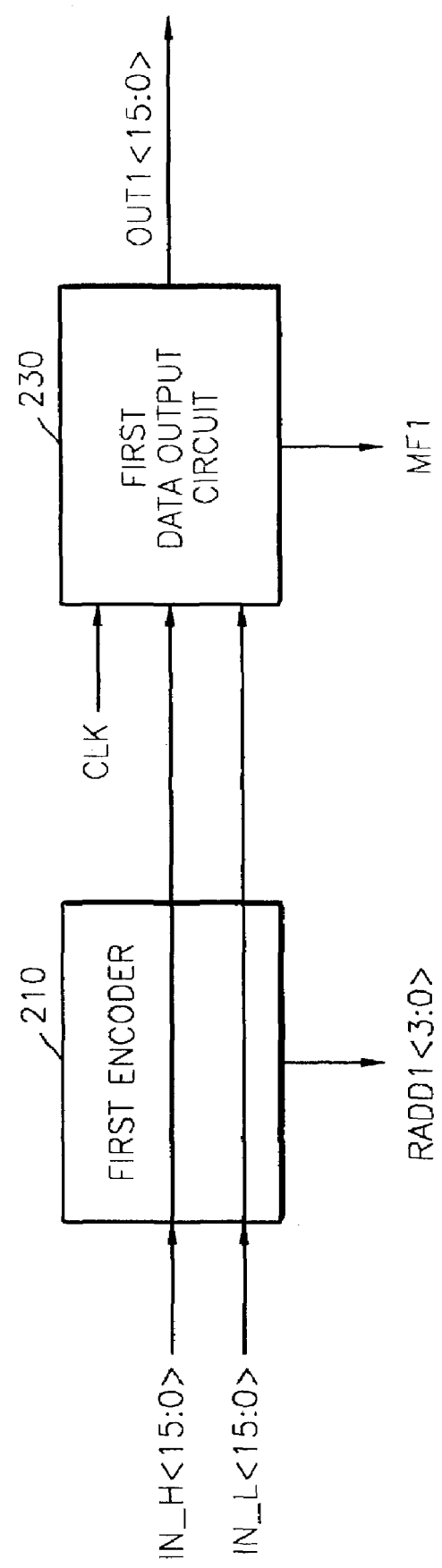
FIG. 2 is a block diagram of the first data detection circuit shown in FIG. 1.

FIG. 2 is a block diagram of the first data detection circuit 110 shown in FIG. 1. As shown in FIG. 2, the first data detection circuit 110 comprises a first encoder 210 and a first data output circuit 230. The first encoder 210 receives the pair (IN_H<15:0>, IN_L<15:0>) of 16-bit input data, detects the location of the bit that is the least significant among bits having the first logic value (for example, 1 or 0) in the received 16-bit input data (IN_H<15:0>), and outputs an encoding value (RADD1) corresponding to the position of the detected bit.

Here, the encoding value (RADD1<3:0>) indicates the location of the bit that is the least significant among bits having the first logic value. Since the input data (IN_H<15:0>) is 16 bits wide, the encoding value (RADD1<3:0>) is therefore 4 bits wide. Therefore, the number of bits of the encoding value may be determined by the number of bits of the input data.

The first data output circuit 230, in response to the clock signal (CLK), receives the pair (IN_H<15:0>, IN_L<15:0>) of 16-bit input data, changes only the detected bit having the first logic value (for example, 1 or 0) in the 16-bit input data (IN_H<15:0>) into a second logic value (for example, 0 or 1), and outputs thus-generated 16-bit intermediate data (OUT1<15:0>).

If the number of bits having the first logic value in the received 16-bit input data (IN_H<15:0>) is 2 or more, the first data output circuit 230 outputs a first indication signal (MF1). In this case, the first indication signal (MF1) has one of a "high" logic level and a "low" logic level.

Figure 3:
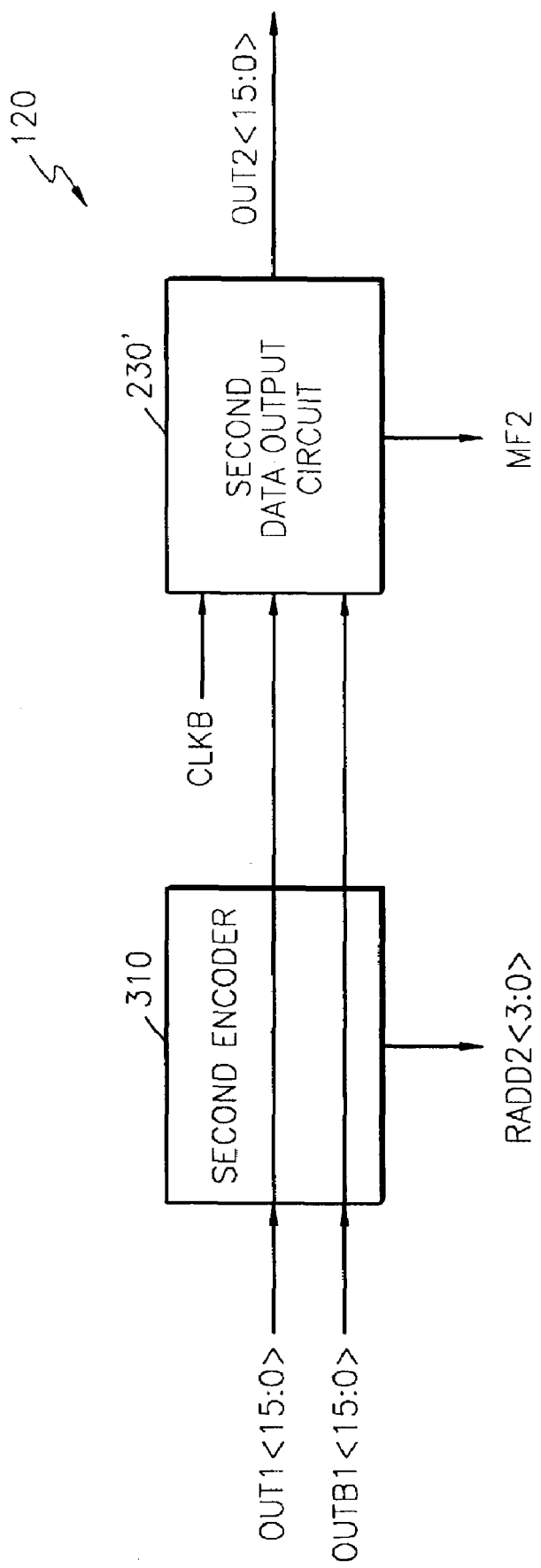
FIG. 3 is a block diagram of the second data detection circuit shown in FIG. 1.

FIG. 3 is a block diagram of the second data detection circuit 120 shown in FIG. 1. Referring to FIG. 3, the second data detection circuit 120 comprises a second encoder 310 and a second data output circuit 230'. The second encoder 310 receives the pair (OUT1<15:0> and OUTB1<15:0>) of 16-bit intermediate data, detects the location of the bit that is the least significant among those bits that have the first logic value in the received 16-bit intermediate data (OUT1<15:0>), and outputs an encoding value (RADD2<3:0>) corresponding to the detected bit.

The second data output circuit 230' in response to the inverted clock signal (CLKB) receives the pair (OUT1<15:0> and OUTB1<15:0>) of 16-bit intermediate data, changes only the detected bit having the first logic value (for example, 1 or 0) in the received 16-bit intermediate data (OUT1<15:0>) into a second logic value (for example, 0 or 1), and outputs thus generated 16-bit output data (OUT2<15:0>).

If the number of bits having the first logic value in the received 16-bit intermediate data (OUT1<15:0>) is 2 or more, the second data detection circuit 230' outputs a second indication signal (MF2).

Figure 4:
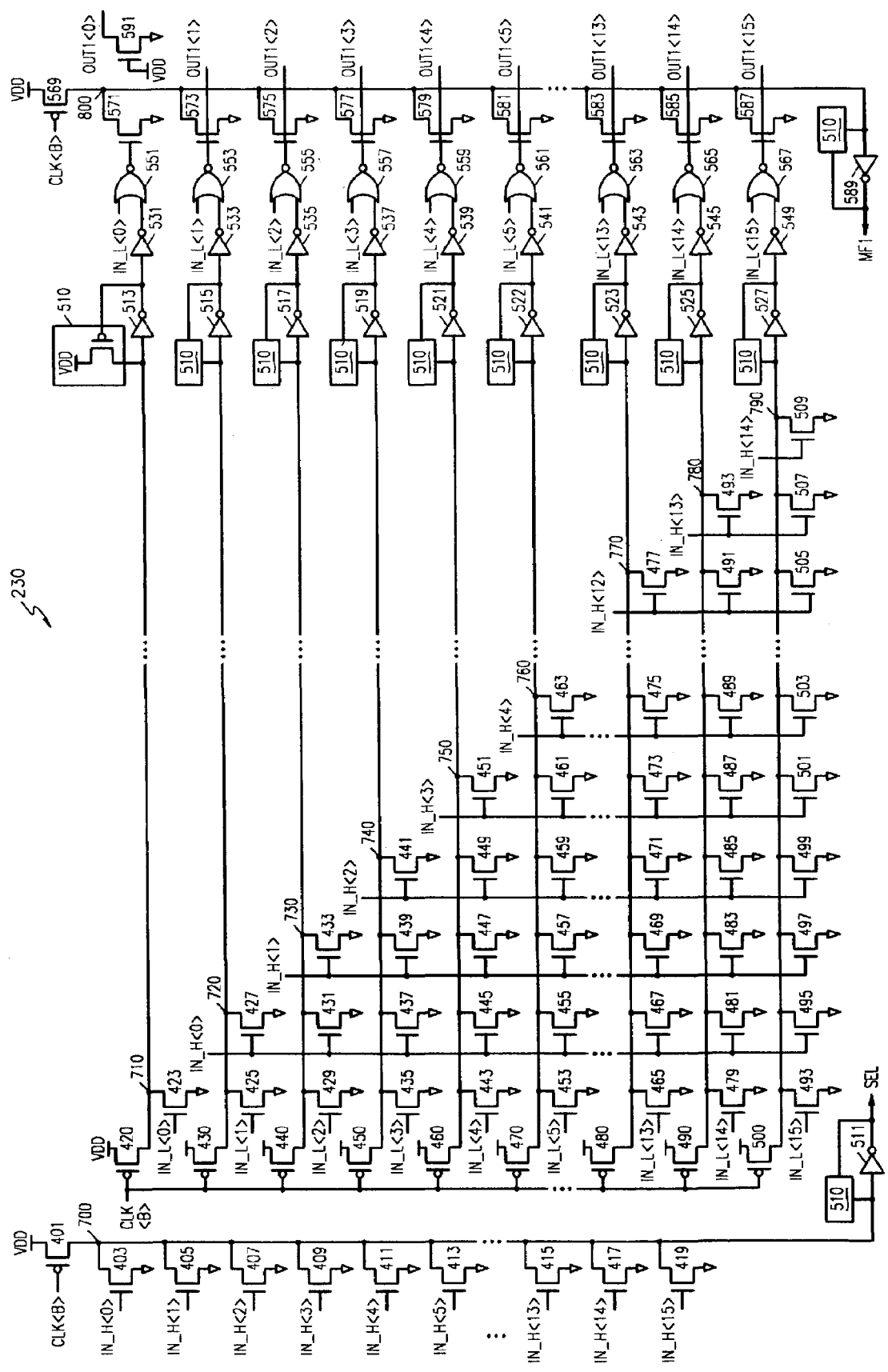
FIG. 4 is a circuit diagram of a data output circuit employed in a data detection circuit according to a preferred embodiment of the present invention.

FIG. 4 is a circuit diagram of a data output circuit employed in a data detection circuit according to a preferred embodiment of the present invention. Referring to FIG. 4, the data output circuit 230 is constructed in a dynamic circuit style.

A plurality of PMOS transistors (401, 420, 430, 440, 450, 460, 470, 480, 490, 500, 569) precharge corresponding nodes (700, 710, 720, 730, 740, 750, 760, ..., 770, 780, 790, 800) to the supply voltage (VDD) level in response to the clock signal (CLK).

The PMOS transistor 401 is connected between the supply voltage (VDD) and the node 700, and the clock signal (CLK) is input to the gate of the PMOS transistor 401.

Data signals (IN_H<0> through IN_H<15>) are input to the gates of corresponding transistors (403, 405, 407, 409, 411, 413, ..., 415, 417, 419) which are connected between the node 700 and the supply voltage (VDD).

The PMOS transistor 420 is connected between the supply voltage (VDD) and the node 710, and the clock signal (CLK) is input to the gate of the POMS transistor 420.

Data signals (IN_L<0> through IN_L<15>) complementary to the data signals (IN_H<0> through IN_H<15>) are input to the gates of corresponding NMOS transistors (423, 425, 429, 435, 443, 453, ..., 465, 479, 493) which are connected between corresponding nodes (710, 720, 730, 740, 750, 760, ..., 770, 780, 790) and the ground level.

The input data (IN_H<0>) is input to the gates of transistors (427, 431, 437, 445, 455, ..., 467, 481, 495) which are connected between corresponding nodes (720, 730, 740, 750, 760, ..., 770, 780, 790) and the ground.

The input data (IN_H<1>) is input to the gates of transistors (433, 439, 447, 457, ..., 469, 483, 497) which are connected between corresponding nodes (730, 740, 750, 760, . . . , 770, 780, 790) and the ground.

The input data (IN_H<2>) is input to the gates of transistors (441, 449, 459, . . . , 471, 485, 499) which are connected between corresponding nodes (740, 750, 760, . . . , 770, 780, 790) and the ground.

The input data (IN_H<3>) is input to the gates of transistors (451, 461, . . . , 473, 487, 501) which are connected between corresponding nodes (750, 760, . . . , 770, 780, 790) and the ground.

The input data (IN_H<4>) is input to the gates of transistors (463, . . . , 475, 489, 503) which are connected between corresponding nodes (760, . . . , 770, 780, 790) and the ground.

For the input data (IN_H<5:11>), circuits are constructed in a similar manner.

The input data (IN_H<12>) is input to the gates of transistors (477, 491, 505) which are connected between corresponding nodes (770, 780, 790) and the ground.

The input data (IN_H<13>) is input to the gates of transistors (493, 507) which are connected between corresponding nodes (780, 790) and the ground.

The input data (IN_H<14>) is input to the gate of transistor 509 which is connected between the node 790 and the ground.

Inverters (513 through 527) are connected between corresponding nodes (710, 720, 730, 740, 750, 760, . . . , 770, 780, 790) and corresponding inverters (531 through 549). A voltage maintaining circuit 510 is connected between the input terminal and the output terminal of each inverter (513 though 527). If the voltage of a corresponding node (710, 720, 730, 740, 750, 760, . . . , 770, 780, 790) is the supply voltage (VDD), the voltage maintaining circuit 510 maintains the voltage of each node (710, 720, 730, 740, 750, 760, . . . , 770, 780, 790) as the supply voltage (VDD).

Referring to FIG. 4, the voltage maintaining circuit 510 is implemented by a PMOS transistor, in which the supply voltage (VDD) is connected to the input terminal of the inverter 513, and the output terminal of the inverter 513 is connected to the gate of the PMOS transistor. Therefore, if the voltage of the input terminal of the inverter 513 is the supply voltage (VDD), the PMOS transistor is turned on such that the supply voltage (VDD) is provided to the input terminal of the inverter 513. The voltage maintaining circuit 510 is also connected between the input terminal and output terminal of each of inverters (511, 589). The output signal of the inverter 589 is the first indication signal (MF1).

NOR gates (551 through 567) receive the output signals of corresponding inverters (531 through 549) and corresponding input data signals (IN_L<0> through IN_L<15>), perform NOR operations, and output the results to the gates of corresponding NMOS transistors (571 through 587).

NMOS transistors (571 through 587) are connected between a node 800 and the ground. The PMOS transistor 569 is connected between the supply voltage (VDD) and the node 800, and the clock signal (CLK) is input to the gate of the PMOS transistor 569.

Since the gate of the NMOS transistor 591 is connected to the supply voltage (VDD), the LSB (OUT1<0>) of the intermediate data (OUT1<15:0>) is always 0 (the ground level). Each intermediate data signal (OUT1<1> through OUT1<15>) is the output signal of a corresponding NOR gate (551 through 567).

Returning to FIG. 3, the second data output circuit 230', in response to the inverted clock signal (CLKB), receives the pair (OUT1<15:0> and OUTB1<15:0>) of the 16-bit intermediate data, changes only the detected bit having the first logic value in the received 16-bit intermediate data (OUT1<15:0>) into the second logic value, and outputs thus generated 16-bit output data (OUT2<15:0>). Therefore, the structure and operation of the first data output circuit 230 are similar to those of the second data output circuit 230'.

Referring to FIGS. 1 through 4, the operation of the data output circuit 110 will now be explained in detail.

First, when the clock signal (CLK) is in a first state (for example, a "low" logic level), each node (700, 710, 720, 730, 740, 750, 760, 770, 780, 790, 800) of the first data output circuit 230 of the first data detection circuit 110 is precharged to the supply voltage (VDD). In this case, the second data detection circuit 120 is inactivated.

Then, when the clock signal (CLK) transits from the first state to a second state (for example, to a "high" logic level), the first data detection circuit 110 performs a data detection operation and each node (700, 710, 720, 730, 740, 750, 760, 770, 780, 790, 800) of the second data output circuit 230' of the second data detection circuit 120 is precharged to the supply voltage VDD.

Assuming that the clock signal (CLK) is in the second state, and that input data (IN_H<15:0>) that is input to the first data detection circuit 110 is (1111111111111100), the first encoder 210 of the first data detection circuit 110 receives the input data (IN_H<15:0>), and outputs an encoding signal (RADD1<3:0>) indicating that the second bit from the LSB of the input data (IN_H<15:0>) is the least significant bit to have the value "1" in the input data (1111111111111100). The encoding signal (RADD1<3:0>) is formed by 4 bits and indicates the encoding value of the detected bit.

The first data output circuit 230 receives the pair (IN_H<15:0>, IN_L<15:0>) of input data. At this time, the complementary input data (IN_L<15:0>) is (0000000000000011). Referring to FIG. 4, OUT1<0> is always 0 (the first state). Since the NMOS transistor 425 is turned on in response to IN_L<1> that is "1", the voltage of the node 720 becomes the ground voltage.

Therefore, the output signal (OUT1<1>) of the NOR gate 553 is 0. Since the voltage of the node 730 is maintained as the supply voltage (VDD), the output signal of the inverter 517 is 0. Therefore, the output signal (OUT1<2>) of the NOR gate 55 is 0.

However, since nodes (740, 750, 760, . . . , 770, 780, 790) are 0 in response to corresponding inputs (IN_H<2> through IN_H<14>), the output signals (OUT1<3> through OUT1<15>) of the corresponding NOR gates (557 through 567) are 1.

Therefore, the intermediate data (OUT1<15:0>) that is output from the first data output circuit 230 is (1111111111111000). That is, the value of IN_H<2> changes from 1 to 0. Since the input data (IN_H<15:0>) is (1111111111111100), the first indication signal (MF1) outputs a 1. If the first indication signal (MF1) 1, this means that the number of bits having the value 1 in the input data (IN_H<15:0>) is 2 or more.

If the clock signal (CLK) transitions from the second state to the first state, the second data detection circuit 120 is activated and the first data detection circuit 110 is deactivated.

If the clock signal (CLK) transitions from the second state to the first state, the intermediate data (OUT1<15:0>) that is output from the first data output circuit 230 is input to the second encoder 310 and the second data output circuit 230' of the second data detection circuit 120.

The second encoder 310 receives each (1111111111111000, 0000000000000111) of the pair (OUT1<15:0>, OUTB1<15:0>) of the intermediate data, and outputs an encoding signal indicating that the third bit from the LSB of the intermediate data (OUT1<15:0>) is the least significant bit to have the value "1" in the intermediate data. The encoding signal (RADD2<3:0>) is formed by 4 bits and indicates the encoding value of the detected bit.

The second data output circuit 230' receives the pair (OUT1<15:0>, OUTB1<15:0>) of the intermediate data, performs the operation explained above referring to FIG. 4, and outputs data (OUT2<15:0>) having the value (1111111111110000). That is, the value of IN_H<3> changes from 1 to 0.

Similarly, assuming that the first data output circuit 230 shown in FIG. 4 receives 16-bit input data (IN_H<15:0>) that is (1010000000000000) and outputs 16-bit intermediate data (OUT1<15:0>) that is (1000000000000000), to the second data detection circuit 120, the second data output circuit 230' of the second data detection circuit 120 outputs data (OUT2<15:0>) that is (0000000000000000).

At this time, the first indication signal (MF1) output from the first data detection circuit 110 is 1 and the second indication signal (MF2) output from the second data detection circuit 120 is 0. When the 16-bit input data (IN_H<15:0>) is (0000000000000000), the node 700 maintains the level of the supply voltage (VDD), and therefore the output signal (SEL) of the inverter 511 is in a "low" logic level.

The output signal (SEL) of the inverter 511 is a signal for determining whether or not there is a bit having a value 1 in the 16-bit input data (IN_H<15:0>). Therefore, when at least one or more bits having the value 1 are in the 16-bit input data (IN_H<15:0>), the output signal (SEL) of the inverter 511 is at a "high" logic level.

As described above, the data detection circuit and data detection method according to the present invention can quickly detect a bit that is the least significant among bits having a first value, for example 1, and a bit that is the second least significant among bits having the first value, in the N-bit input binary data.

Also, since the data detection circuit according to present invention increases the operation speed of an adder, a multiple register, an address detection circuit, or a test processor in which it is employed, it therefore increases the operation speed of a microprocessor employing the adder, multiple register, address detection circuit or test processor.

While this invention has been particularly shown and described with references to preferred embodiments thereof, it will be understood by those skilled in the art that various changes in form and details may be made herein without departing from the spirit and scope of the invention as defined by the appended claims.

For example, a trailing zero circuit can be formed in accordance with the principles of the embodiment described above.

What is claimed is:

1. A data detection method comprising:
   receiving N-bit input data, detecting a first bit that is the least significant among bits having a first value in the received N-bit input data, changing only the value of the detected first bit in the N-bit input data into a second value, and outputting thus generated N-bit intermediate data, in response to a clock signal; and
   receiving the N-bit intermediate data, detecting a second bit that is the least significant among bits having the first value in the received N-bit intermediate data, and outputting a result of the detection of the second bit, in response to an inverted signal of the clock signal.

2. The data detection method of claim 1, wherein if the first value is 1, the second value is 0.

3. The data detection method of claim 1, wherein if the first value is 0, the second value is 1.

4. The data detection method of claim 1, wherein the result of the detection of the second bit includes an encoding value corresponding to the detected second bit.

5. The detection method of claim 1 further comprising changing only the value of the detected second bit that is the least significant among bits having the first value in the received N-bit intermediate data into the second value.

6. The data detection method of claim 5, wherein the result of the detection of the second bit includes N-bit output data generated by changing only the value of the detected second bit in the received N-bit intermediate data into the second value.

7. A data detection circuit comprising:
   a first data detection circuit which receives N-bit input data, detects a first bit that is the least significant among bits having a first value in the received N-bit input data, changes only the value of the detected first bit in the N-bit input data into a second value, and outputs thus generated N-bit intermediate data, in response to a clock signal; and
   a second data detection circuit which receives the N-bit intermediate data, detects a second bit that is the least significant among bits having the first value in the received N-bit intermediate data, and outputs a result of the detection of the second bit, in response to an inverted signal of the clock signal.

8. The data detection circuit of claim 7, wherein the first data detection circuit comprises:
   a first encoder which receives the N-bit input data, detects the first bit that is the least significant among bits having the first value in the received N-bit input data, and outputs an encoding value corresponding to the detected first bit; and
   a first data output circuit which receives the N-bit input data, changes only the value of the detected first bit in the N-bit input data into the second value, and outputs the thus generated N-bit intermediate data, in response to the clock signal.

9. The data detection circuit of claim 7, wherein the second data detection circuit comprises:
   a second encoder which receives the N-bit intermediate data, detects the second bit that is the least significant among bits having the first value in the received N-bit intermediate data, and outputs an encoding value corresponding to the detected second bit; and
   a second data output circuit which receives the N-bit intermediate data, changes only the value of the second bit that is the least significant among bits having the first value in the N-bit intermediate data into the second value, and outputs thus generated N-bit output data, in response to the inverted signal of the clock signal.

10. The data detection circuit of claim 7, wherein the first data detection circuit outputs a first indication signal if the number of bits having the first value in the received N-bit input data is at least two.

11. The data detection circuit of claim 7, wherein the second data detection circuit outputs a second indication signal if the number of bits having the first value in the received N-bit intermediate data is at least two.

12. The data detection circuit of claim 7, wherein if the first value is 1, the second value is 0.

13. The data detection circuit of claim 7, wherein if the first value is 0, the second value is 1.

14. The data detection circuit of claim 9, wherein the result of the detection of the second bit includes the encoding value corresponding to the detected second bit.

15. The data detection circuit of claim 9, wherein the result of the detection of the second bit includes the thus generated N-bit output data.

16. A data detection circuit for detecting a first bit that is the least significant among bits having a first value, and a second bit that is the second least significant among bits having the first value, in input data, the data detection circuit comprising:
 a first data detection circuit which receives the input data, detects the first bit that is the least significant among bits having the first value in the input data, and outputs a result of the detection of the first bit; and
 a second data detection circuit which receives data output from the first data detection circuit, detects a second bit that is the least significant among bits having the first value in the output data, and outputs a result of the detection of the second bit,
 wherein the data output from the first data detection circuit are generated by changing only the value of the first bit detected as being the least significant among bits having the first value in the input data into a second value.

17. The data detection circuit of claim 16, wherein if the first value is 1, the second value is 0.

18. The data detection circuit of claim 16, wherein if the first value is 0, the second value is 1.

19. The data detection circuit of claim 16, wherein the result of the detection of the first bit includes an encoding value corresponding to the detected first bit.

20. The data detection circuit of claim 16, wherein the result of the detection of the first bit includes the data output from the first data detection unit.

21. The data detection circuit of claim 16, wherein the result of the detection of the second bit includes an encoding value corresponding to the detected second bit.

22. The data detection circuit of claim 16, wherein the result of the detection of the second bit includes N-bit output data generated by changing only the value of the detected second bit in the received data output from the first data detection circuit into the second value.

* * * * *